United States Patent [19]

Grant et al.

[11] Patent Number: 5,330,658
[45] Date of Patent: Jul. 19, 1994

[54] SOLUTION DECONTAMINATION METHOD USING PRECIPITATION AND FLOCCULATION TECHNIQUES

[75] Inventors: David C. Grant, Gibsonia; Edward J. Lahoda, Edgewood; Ching-Yu Lin, Monroeville; Francis Talko, N. Huntingdon, all of Pa.

[73] Assignee: Westinghouse Electric Corporation, Pittsburgh, Pa.

[21] Appl. No.: 32,362

[22] Filed: Mar. 17, 1993

[51] Int. Cl.$^5$ ............................................. C02F 1/56
[52] U.S. Cl. ................................... 210/717; 210/718; 210/719; 210/720; 210/725; 210/727; 210/912; 210/913; 210/914; 588/18
[58] Field of Search ............... 210/710, 717, 718, 719, 210/720-722, 724, 725, 726, 727, 912-914; 134/25.1; 252/631

[56] References Cited

U.S. PATENT DOCUMENTS

| | | | |
|---|---|---|---|
| 3,931,007 | 1/1976 | Sugano et al. | 210/912 |
| 4,312,840 | 1/1982 | Habib, Jr. et al. | 423/17 |
| 4,349,513 | 9/1982 | Ishiwata et al. | 423/12 |
| 4,377,508 | 3/1983 | Rothberg | 210/721 |
| 4,423,008 | 12/1983 | Yan | 423/7 |
| 4,724,084 | 2/1988 | Pahmeier et al. | 210/759 |
| 4,737,315 | 4/1988 | Suzuki et al. | 252/632 |
| 4,758,353 | 7/1988 | Spence et al. | 210/727 |
| 4,772,384 | 9/1988 | Schonert et al. | 209/425 |
| 4,783,263 | 11/1988 | Trost et al. | 210/638 |
| 4,841,998 | 6/1989 | Bruya | 134/10 |
| 4,923,125 | 5/1990 | Bateson et al. | 241/20 |
| 4,983,306 | 1/1991 | Deininger et al. | 210/912 |
| 5,045,214 | 9/1991 | Walker | 210/912 |
| 5,045,240 | 9/1991 | Skriba et al. | 252/626 |
| 5,056,541 | 10/1991 | Schade et al. | 134/25.1 |
| 5,106,508 | 4/1992 | Schwitzgebel | 210/712 |

OTHER PUBLICATIONS

Wiley, "Finding Treatment Options For Inorganics," *Water/Engineering & Management*, Oct. 1987, pp. 28-31.

Canter, et al., "Ground Water Pollution Control," Lewis Publishers, Inc. 1985, pp. 110-120.

Assink, et al., "Extractive Methods For Soil Decontamination; A General Survey And Review Of Operational Treatment Installations," *Contaminated Soil*.

Werther, et al., "Sand From Dredge Sludge—Development Of Processes For The Mechanical Treatment Of Dredged Material," *Contaminated Soil*, Martinus Nijhoff.

*Primary Examiner*—Peter A. Hruskoci
*Attorney, Agent, or Firm*—Daniel P. Cillo; Lynn B. Morreale

[57] ABSTRACT

Solutions such as for example groundwater, drinking water, extracting solutions and effluents contaminated with metals, radioactive species and organics, singly or in combination, are treated by first removing undesirable oxidizing agents from the contaminated solution. Then the contaminated solution is separately treated with aqueous solutions of ferrous sulfate and hydroxide, which precipitate substantially all of the contaminants. Next, the precipitate is treated with a flocculant and/or a coagulant to form an easily dewaterable and separable solid. The solid contaminants are readily removed from the cleansed solution. The process utilizes a novel combination of steps which maximizes contaminant removal, minimizes waste volume, and produces a recyclable solution and a manageable waste stream. The preferred hydroxide solutions are sodium hydroxide, calcium hydroxide, and ammonium hydroxide.

17 Claims, No Drawings

SOLUTION DECONTAMINATION METHOD USING PRECIPITATION AND FLOCCULATION TECHNIQUES

BACKGROUND OF THE INVENTION

This invention relates generally to precipitation and flocculation methods for decontaminating various types of solutions which are contaminated with a variety of contaminants such as heavy metals, radioactive compounds, and organic compounds, using a novel combination of treatment steps. More particularly, this invention relates to methods for decontaminating solutions using aqueous solutions of ferrous sulfate and hydroxides, in combination with flocculants, to precipitate the contaminants and ultimately separate them from solution.

There is increasing concern over the hazards posed by the rising levels of inorganic and organic contaminants within the world's water supplies due to accidental spills, leaks, mining practices and poor disposal practices. Most heavy metal and organic contaminants are toxic to some degree to all life-forms, and can have a deleterious effect on aquatic flora and fauna. In humans, toxic heavy metal poisoning can lead to severe nervous system disorders and can cause death.

In addition, the contamination of drinking water, ground water, soil washing extracting solutions, and leaching solutions presents a further problem in that large volumes of solution typically are affected, making treatment especially problematic. This problem is aggravated in geographical locations where water is in short supply, and the need to recycle is great.

Accordingly, numerous physical, chemical and biological methods for the removal of various contaminants from solutions have been proposed. For example, contaminated water could be treated with aerobic and anaerobic biological purification, electrolysis, membrane filtration, and ion exchange techniques. See "Extractive Methods For Soil Decontamination; A General Survey and Review of Operational Treatment Installations," J. W. Assink, in Contaminated Soil, Edited by J. W. Assink, and W. J. van den Brink, pp. 658, 1986, Martinus Nijhoff Publishers. However, there are problems associated with each of these methods. Contaminated groundwater, soil washing solutions and leaching solutions typically have unique characteristics which adversely effect these available processes. For example, such solutions can contain suspended solids, dissolved humics, or varying compositions, which prevent the successful application of these techniques. In addition, many are not suitable for treatment of large volumes of water due to equipment limitations and cost constraints. For example, ion exchange processes are costly and adversely affected by solids, humics, and even slight changes in solution chemistry. Thus, significant amounts of contamination may remain even after application of the treatment.

Alternatively, it has been suggested that inorganic and organic contaminants in solution can be removed via precipitation techniques, wherein the contaminant is precipitated from solution at a specific pH using carbonates, hydroxides, sulfides, and/or silicates, in conjunction with flocculants or coagulants. Several of these techniques are described in Canter, L. W., and Knox, R. C., Ground Water Pollution Control, Lewis Publishers, Inc., 1985, pp. 110-120; and Willey, B. R., Finding Treatment Options for Inorganics, in WATER/Engineering & Management, Oct. 1987, pp. 28-31. Precipitation methods suffer from another set of drawbacks. For example, sulfide systems are difficult to handle, complex to operate, and often result in high waste volume and harmful residual levels of precipitating agent. Sulfide sludges also are susceptible to oxidation to sulfate when exposed to air, resulting in resolubilization of the metals. Carbonate systems, while relatively easy to operate, are difficult to control and often result in processing problems such as premature plugging of equipment. Hydroxide systems are widely used to remove inorganics because they are the most reliable, and have the added advantages of ease in chemical handling and low volume of sludge. However, the resulting sludge often is gelatinous and difficult to dewater, making treatment, separation, and storage of the contaminated material difficult. Silicate precipitation is not effective on all inorganic contaminants; for example, it does not readily precipitate anionic contaminants or mercury. Therefore, silicate precipitation methods usually are inefficient and ineffective in reducing the level of certain contaminates to environmentally acceptable levels.

What is needed is a simplified, easy-to-operate method of treating large volumes of solutions containing soluble and insoluble heavy metals, radioactive contaminants, and organic contaminants, singly or in combination, which effectively segregates the contaminates from the clean solution and concentrates the contaminated material in a manageable, low volume, concentrated waste stream.

There is a further need for a system that can effectively recover contaminants from extracting solutions used in soil washing processes, which allows recycling of the extracting solution, which requires a minimal amount of equipment and is economical to operate, and which further allows for the processing of recovered contaminants, such as metals, or other salable minerals.

There is also a need for a system which can effectively decontaminate solutions contaminated with both anionic and cationic ions.

There is a further need for a system which can effectively decontaminate solutions containing suspended solids, mobilized soil organics (e.g., humics), and having varying compositional make-ups.

SUMMARY OF THE INVENTION

These and other needs are satisfied by the invention which is characterized by treating streams such as groundwater, drinking water, soil extracting solutions, leaching solutions, and the like, which are contaminated with inorganic and organic contaminates, either singly or in combination, with a unique combination of treatment steps. In the first step of one preferred embodiment of the process, the undesirable oxidizing agents present in the contaminated stream to be treated are removed. The stream is then treated with a solution of ferrous sulfate to absorb ultra-fine contaminant particles, bind together larger contaminants, precipitate contaminants, and/or to reduce any soluble contaminants to a lower solubility state. Next, the stream is treated with an hydroxide solution. Ferrous hydroxide and/or ferric hydroxide readily coprecipitates with the contaminants, entrapping the contaminants therein and maximizing contamination removal. Next, the coprecipitate is treated with a flocculant to produce a solid which is easily dewatered and separated from the clean stream.

In practicing the precipitation method of the invention, it is essential that the contaminated stream to be treated is conditioned prior to treatment with precipitant. As used herein, the term "conditioned" means that any oxidant which is present in the stream is removed and, where possible, collected for reuse. It has been found that the controlled removal and collection of oxidizing agents prior to treatment with a precipitant minimizes the consumption of precipitating agent and the generation of waste volume. If the oxidant is not removed prior to treatment, the oxidant may have a greater affinity for the reducing/precipitating agent than the contaminant, thereby interfering with reduction and/or precipitation of contaminants. As a result, a greater amount of precipitant is used, a larger volume of waste is generated, and a higher clean-up cost is incurred.

In another embodiment of the invention, the method of the invention may be applied to solutions that do not contain oxidants therein. Of course, in this embodiment the oxidant removal step is omitted altogether.

Accordingly, it is an object of this invention to provide a precipitation method for the decontamination of solutions which produces a clean solution having environmentally acceptable levels of contamination, and a readily manageable waste stream having a relatively low volume.

It is a further object of this invention to provide a precipitation method for the decontamination of solutions wherein the chemicals are easy to handle, and the system is simple to operate and control.

It is yet another object of this invention to provide a precipitation method which can be utilized without posing safety and health problems to workers, and without harmful impact to the environment.

DETAILED DESCRIPTION OF THE INVENTION

The present invention is directed to methods for treating various solutions, and especially soil washing extracting solutions, which are contaminated with soluble and insoluble inorganic (including radioactive) and organic species. While this process will be described primarily for removal of heavy metals like lead, mercury, arsenic, barium, boron, cadmium, chromium, silver, selenium, beryllium, copper, nickel, antimony, molybdenum, vanadium, zinc, uranium, radium, thorium, thallium, cesium, strontium, cobalt, plutonium, and mixtures thereof, and the like, it also encompasses removal of other hazardous species such as aromatic and aliphatic hydrocarbons. These aromatic hydrocarbons include, by way of illustration: polynuclear aromatic hydrocarbons like benzo[a]anthracene, benzo[a]pyrene, benzo[b]fluoranthene, benzo[k]fluoranthene, chrysene, acenaphthylene, anthracene, benzo[ghi]perylene, fluorene, phenanthrene, dibenzo[a,h]anthracene, indeno[1,2,3-cd]pyrene, and pyrene; mononuclear aryls like benzene; substituted mononuclear aryls; dinuclear aryls like naphthalene; polychlorinated biphenyls, chlorinated benzenes; chlorinated naphthalenes; chlorinated phenols; and petroleum products. Aliphatic hydrocarbons may include, for example, hydrocarbons having 4 or more carbon atoms, alcohols, ketones, aldehydes, amines, esters, and the like.

As used herein, the term "stream" includes all forms of solutions in which contaminates may be found, such as, for example, groundwater, drinking water, soil washing extractants, leachates, effluents, etc.

As used herein, the phrase "oxidizing agent" includes all forms of inorganic or organic matter which result in the oxidation of contaminants. For illustration purposes only, examples of oxidizing agents include dissolved oxygen, hydrogen peroxide, ozone, chlorine, chlorine dioxide, potassium permanganate, manganese dioxide, nitric acid, sodium hypochlorite, potassium hypochlorite, magnesium hypochlorite and calcium hypochlorite. Typically, oxidizing agents are used to assist in soil washing and in-situ leaching processes, by oxidizing the contaminants and rendering them either more or less soluble in the extracting fluid, depending upon the goal to be accomplished. The treatment method of the invention is also intended to cover and may be applied to treat solutions containing reducing agents, like hydrogen, hydrogen sulfide, and sodium bisulfite, which may interfere with the precipitation/decontamination process.

"Coprecipitation" as used with respect to the invention described herein refers to the chemical phenomenon where, within a solution containing a cationic precipitate precursor, an anionic precipitate precursor, and one or more coprecipitant precursors, the cationic and anionic precipitate precursors are caused to chemically react and precipitate out of the solution as precipitate particles; and, as the precipitate particles are formed, coprecipitant precursors are removed from the solution by adsorption onto the surface of precipitate and/or by occlusion within the interior of the precipitate. Coprecipitation as used herein further includes any precipitation reaction which generally involves anionic and cationic precipitate precursors. The term "occlusion" as used herein refers to the entrapment of foreign ions within a precipitate by physical encapsulation within the precipitate walls and/or by chemical bonding within the precipitate structure.

For purposes of the invention described herein, "coprecipitates" include precipitates, and vice versa, and both terms cover any substance precipitated from solution.

As used herein, the term "flocculant" includes coagulants, in anionic, cationic, non-ionic, polymeric and non-polymeric forms.

The method of the invention begins, if need be, with removal of undesirable oxidizing agents which are present in the contaminated stream to be treated. Many solutions to be treated, particularly those used in soil washing or leaching processes, will contain oxidants. Of course, when necessary, steps must be taken to determine the presence and the identity of the oxidant before beginning the process described herein. When oxidants are present and their identity known, the first step of the method is to remove, and where possible, to collect any such oxidants for recycling and reuse. The oxidant(s) can be removed (and collected) using any known physical, chemical or biological method. For example, aerating the solution and/or adjusting the pH can be used to effectively remove certain oxidants such as, for example, sodium hypochlorite. Other suitable techniques include heating and chemical addition.

If the stream to be treated contains undissolved organics, some soap (including, for example, any soap and/or detergent which is well known to those of ordinary skill in the art) may be added before ferrous sulfate addition. It has been determined experimentally that the addition of soaps results in streams having low residual organic levels. It is believed that this is due to the fact that soaps strongly associate with any undissolved organics and, upon the addition of ferrous sulfate, iron ions (in various ionic form) react with the soap to form an insoluble coprecipitate containing the soap plus the attached organics. As a result, much lower levels of residual organics are achieved than can be achieved using ferrous sulfate and hydroxide solution alone. Soap may be added at a ratio of about 0.1 to 10 moles of soap to about 1 mole of undissolved organics, and preferably is added at a roughly stoichiometric ratio, i.e., about one mole of soap per mole of undissolved organic.

The oxidant free contaminated stream is then treated with an aqueous solution of ferrous sulfate. The ferrous ion in the ferrous sulfate solution serves to precipitate the contaminant, and/or to chemically reduce the oxidation state and thus, the solubility of the contaminants, thereby precipitating certain contaminants. Preferably, the ferrous sulfate solution comprises from about 1% to about 100% (added as a solid) ferrous sulfate by weight, even more preferably from about 10% to about 25%, and most preferably from about 18% to about 22%.

The amount of ferrous sulfate solution added is determined by the condition of the stream to be treated. Preferably, the amount of ferrous sulfate added should be sufficient to ensure that substantially all of the contaminants which can be chemically reduced by ferrous ion have been reduced.

Although ferric sulfate or ferric chloride could be used in this step, ferrous sulfate is preferred for several reasons. For example, ferrous sulfate can serve to reduce as well as coprecipitate the contaminants, thereby reducing the solubility of the contaminants and rendering them more amendable to treatment in the next step. In addition, ferrous sulfate is preferred for environmental and safety reasons. For example, ferrous sulfate is less corrosive than ferric chloride and less hazardous than ferric sulfide.

Although treatment with ferrous sulfate will significantly reduce the solubility of the contaminants in the stream, it generally will not be adequate to precipitate the contaminants to a degree which will permit collection and removal of contaminants to environmentally acceptable levels. For example, due to the nature of the precipitate (which tends to be light, slow to settle and very fine), it may be difficult to collect the precipitate and separate it from the solution. In this regard, the addition of hydroxide solution in the next step results in the formation of ferrous hydroxide and/or ferric hydroxide which will enhance contaminant removal and aid in the separation and collection of precipitate from the cleansed solution. Although not intending to be limited to any theory, it is believed that ferrous hydroxide and/or ferric hydroxide coprecipitates, occludes, or absorbs the precipitates, contaminant ions, and/or the ferric ions in the stream. In order to insure precipitation of substantially all of the contaminant, the hydroxide solution should be added in an amount sufficient to increase the pH of the stream to at least about 9, and preferably to between about 9 to about 12.

The stream may be treated with any suitable aqueous hydroxide solution known to the those skilled in the art, including, for example, solutions of alkali or alkaline metal hydroxides. Preferably the stream is treated with an hydroxide solution selected from the group consisting of sodium hydroxide, calcium hydroxide, barium hydroxide, ammonium hydroxide, potassium hydroxide, magnesium hydroxide, or mixtures thereof. Sodium hydroxide, calcium hydroxide and ammonium hydroxide solutions are more preferred, and sodium hydroxide is especially preferred.

When treated with an hydroxide solution like sodium hydroxide, preferably the solution comprises from about 1% to about 100% (alkali metal added as a solid) alkali metal hydroxide by weight, even more preferably from about 10% to about 50% by weight, and most preferably from about 20% to about 30%.

The hydroxide solution promotes precipitation for several reasons. First, the solubility of many metal hydroxides is relatively low. Second, hydroxide ions readily precipitate with iron in solution, which in turn results in coprecipitation of any remaining contaminants. Thus, the iron/hydroxide precipitation reaction acts as a scavenger for any contaminants. Third, the addition of hydroxide solution provides an excellent indication of whether or not sufficient ferrous sulfate was added to the stream in the previous step. If sufficient ferrous sulfate was added, a green precipitate should form upon the addition of hydroxide ion. Accordingly, if a green precipitate is not seen upon the addition of hydroxide solution, the previous step should be repeated and more ferrous sulfate added.

The coprecipitates formed from the addition of ferrous sulfate and hydroxide solutions (including any precipitates formed in the earlier step with ferrous sulfate) are readily dewatered with the use of flocculating agents. Suitable flocculating agents are well known to those of ordinary skill in the art, and include, for example, MAGNIFLOC 905N and 1906N (American Cyanamid, Wayne, N.J.). Preferably, the concentration of the flocculant is about 0,001% to about 5% by weight, more preferably, about 0.01% to about 1% by weight, and even more preferably, about 0.05% to about 0.5%. Generally, the flocculant is added in an amount ranging from about $1 \times 10^{-5}$ to about $1 \times 10^{-2}$ pounds per pound of coprecipitate, preferably about $1 \times 10^{-4}$ to about $1 \times 10^{-2}$, and even more preferably about $5 \times 10^{-4}$ to about $5 \times 10^{-3}$ pounds per pound of coprecipitate.

The flocculated solids are easily separated from the clean solution using any suitable technique known to those of ordinary skill in the art including settling and/or filtration techniques. With the present invention, it is possible to significantly lower the amount of inorganic and organic contamination in solution to environmentally acceptable levels as set forth in the Federal Primary Drinking Water Standard (40 C.F.R., Part 141).

Each of the above described steps may be undertaken in any order as long as the treatment method results in a decontaminated stream having acceptable levels of contamination. In one preferred embodiment, removal of oxidant from the stream is followed by treatment with ferrous sulfate solution, which is followed by treatment with hydroxide solution, which is followed by treatment with a flocculant. In another embodiment, the hydroxide solution is added prior to treatment with ferrous sulfate and flocculant. In yet another embodiment, the stream does not contain any oxidant and therefore the removal of the oxidant step is omitted altogether.

The above described method is intended to be used off-site and above ground in any suitable batch or continuous flow process. For example, the method may be used with one or more mixing tanks. That is, the entire process could be carried out in one tank, or alternatively, a different tank could be used for a each treatment step. The method is especially suitable for treatment of extracting solutions used in various soil washing processes, in particular those described in U.S. Pat. No. 5,128,068, which issued on Jul. 7, 1992, from U.S. patent application Ser. No. 529,092, filed May 25, 1990; U.S. patent application Ser. No. 648,673, filed Jan. 31, 1991, in the name of Lahoda et al.; U.S. Pat. No. 5,045,240, issued on Sep. 3, 1991, from U.S. patent application Ser. No. 345,852, filed May 1, 1989; and U.S. patent application Ser. No. 722,458, filed Jun. 27, 1991, in the name of Grant, et al., the disclosures of which are incorporated herein in their entirety. The method of the invention also is particularly suitable to treat contaminated effluents resulting from sandblasting clean-up systems, and paint removal processes.

The ability to accomplish solution decontamination using the methods of the invention, and in particular the novel combination of process steps, is demonstrated in the following examples.

EXAMPLE 1—REMOVAL OF OXIDANT

Sodium hypochlorite is an oxidant which frequently is found in soil washing solutions, and which must be removed prior to further treatment of the solution in order to minimize the amount of precipitating agent to be added in later steps. To remove this oxidant, the pH of the solution was reduced to 7 or less using hydrochloric acid. Then the solution was aggressively mixed and/or aerated. The combination of the lower pH and aeration drove off the oxidant as chlorine gas.

The chlorine gas then was collected in a scrubber containing sodium hydroxide. The sodium hydroxide reacted with the chlorine gas to form sodium hypochlorite which can then be reused in a soil washing or leaching process.

It is believed that the following reactions are involved in this process:

$$ClO^- + H_2O \leftrightarrow HClO + OH^-$$

$$HClO + OH^- + 2HCl \rightarrow 2H_2O + Cl_2(g) + Cl^-$$

EXAMPLE 2

A soil washing extraction solution which contained 20 g/L sodium hypochlorite, 141 ppm mercury and 62 ppm uranium was treated in a batch process as follows.

First the pH of the solution was lowered to between about 1 and 6 using hydrochloric acid, and then the solution was aerated for from about 1 to about 24 hours. The lower the pH of the solution, the less time required for aeration.

Next, a solution of ferrous sulfate (30% by weight) was added to reduce and/or precipitate the uranium and mercury. The amount of ferrous sulfate solution added varied from 5 to 50 milliliters per liter of extraction solution. It is believed that the following reactions were involved in this treatment step:

$$U^{+6} + 2Fe^{+2} \leftrightarrow U^{+4}(s) + 2Fe^{+3}$$

$$2Hg^{+2} + 2Fe^{+2} \leftrightarrow Hg_2^{+2} + 2Fe^{+3}$$

$$Hg_2^{+2} + 2Fe^{+2} \leftrightarrow 2Hg(s) + 2Fe^{+3}$$

Next, sodium hydroxide solution (10% by weight) was used to adjust the pH of the solution to between 9 and 12. It is believed that the following reactions are involved in this treatment step:

$$Hg_2^{+2} + 2OH^- \rightarrow HgO(s) + Hg(s) + H_2O$$

$$Hg^{+2} + 2OH^- \rightarrow HgO(s) + H_2O$$

$$Fe^{+2} + 2OH^- \rightarrow Fe(OH)_2(s)$$

$$Fe^{+3} + 3OH^- \rightarrow Fe(OH)_3(s)$$

In the next step, MAGNIFLOC 905N (0.2% by weight) was added to the solution until the solids rapidly settled. The amount of flocculant added varied from about $5 \times 10^{-4}$ to about $5 \times 10^{-3}$ lbs of flocculant per pound of precipitate.

In the last step, the solids were rapidly filtered from the solution. The cleansed solution contained less than 1 ppm mercury and uranium each.

EXAMPLE 3

A soil washing extraction solution which contained 5% by weight sodium hydroxide, approximately 3 ppm lead and extremely find lead particles which were not filterable was treated as follows.

First, a solution of ferrous sulfate (22% by weight) was added to the solution to reduce and/or precipitate the soluble lead and the lead particles. The amount of ferrous sulfate solution added was approximately 16 milliliters of ferrous sulfate solution per liter of extraction solution. It is believed that the following reactions are involved in this treatment step:

$$Fe^{+2} + 2OH^- \rightarrow Fe(OH)_2(s)$$

$$Fe^{+3} + 3OH^- \rightarrow Fe(OH)_3(s)$$

$$Pb^{+2} + 2OH^- \rightarrow Pb(OH)_2(s)$$

$$2Fe^{+2} + Pb^{+2} \rightarrow Pb(s) + 2Fe^{+3}$$

In the next step, MAGNIFLOC 905N (0.05% by weight) was added to the solution until the solids rapidly settled. The amount of flocculant added varied from about $1.5 \times 10^{-4}$ to about $3 \times 10^{-4}$ lbs of flocculant per pound of precipitate.

In the last step, the solids, including the previously difficult to remove lead fines, were rapidly filtered from the solution. The cleansed solution contained less than 1 ppm lead. In addition, the solution was reusable as an extractant.

EXAMPLE 4

A soil washing extraction solution which contained 20 g/L sodium hypochlorite, and from 3 to 13 ppm chromium was treated as follows.

First the pH of the solution was lowered to less than about 6 and greater than about 1 using hydrochloric acid, and then the solution was aerated for from about 1 to about 24 hours. The lower of pH of the solution, the less time required for aeration.

Next, a solution of ferrous sulfate (50% by weight) was added to precipitate the chromium. The amount of ferrous sulfate solution added varied from 1 to 6 milliliters per liter of extraction solution. It is believed that the following reactions were involved in this treatment step:

$$Cr^{+6} + Fe^{+2} + 2e^- \rightarrow Cr^{+3} + Fe^{+3}$$

or $$CrO_4^{-2}(aq) + 3Fe^{+2}(aq) + 4H_2O \rightarrow$$

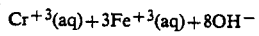

Next, sodium hydroxide solution (10% by weight) was used to adjust the pH to between 9 and 12. The following reactions are involved in this treatment step:

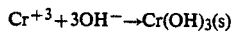

In the next step, MAGNIFLOC 905N (0.2% by weight) was added to the solution until the solids rapidly settled. The amount of flocculant added varied from about $1 \times 10^{-3}$ to about $3 \times 10^{-3}$ lbs of flocculant per pound of precipitate.

In the last step, the solids were rapidly filtered from the solution. The cleansed solution contained less than 1 ppm chromium.

From the above, it can be seen that the invention provides a simple, yet highly effective method for treating solutions contaminated with inorganic and radioactive species. The process utilizes a novel combination of steps which maximize contaminant removal, minimize waste volume, produce a recyclable solution, and a manageable waste stream. In addition, the method of the invention results in a precipitate which is readily treated and separated from the cleansed solution. It also reduces the potential for airborne contamination. Accordingly, the method of the invention is environmentally sound and economically attractive.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method for removing heavy metal and/or radioactive contaminants and oxidizing agents selected from the group consisting of hydrogen peroxide, ozone, chlorine, chlorine dioxide, potassium permanganate, manganese dioxide, nitric acid, sodium hypochlorite, potassium hypochlorite, magnesium hypochlorite and calcium hypochlorite, from a contaminated stream, said method including the steps of:
   a. removing substantially all of said oxidizing agents from said contaminated stream by adjusting the pH of the stream, and/or aerating said stream for from between about 1 to 24 hours;
   b. treating said stream with aqueous ferrous sulfate solution to reduce and/or precipitate said contaminants;
   c. treating said stream with an effective amount of a hydroxide solution sufficient to increase the pH of the stream to between about 9 to 12, such that the precipitates, the contaminants, and/or the ferrous ions form coprecipitates with the hydroxide ion which are substantially insoluble in said stream;
   d. treating said stream with a flocculant; and
   e. separating said coprecipitates from the stream;
   wherein step (a) is performed prior to steps (b) and (c).

2. The method of claim 1 wherein said stream is groundwater, leachate, a soil washing extraction solution, drinking water or effluent.

3. The method of claim 1 wherein said stream contains at least one radioactive contaminant.

4. The method of claim 1 wherein said stream contains at least one contaminant selected from the group consisting of lead, mercury, arsenic, barium, boron, cadmium, chromium, silver, selenium, beryllium, copper, nickel, antimony, molybdenum, vanadium, zinc, uranium, radium, thorium, thallium, cesium, strontium, cobalt, and plutonium.

5. The method of claim 1 wherein said stream further contains an organic contaminant.

6. The method of claim 5 further comprising the step of treating said stream with soap to provide a precipitable organic contaminant, prior to treating said stream with aqueous ferrous sulfate in step (b).

7. The method of claim 1 wherein step (a) comprises reducing the pH of the stream, and/or aerating said stream for from between about 1 to 24 hours.

8. The method of claim 7 wherein step (a) comprises reducing the pH of the stream to about 7 or less, and/or aerating said stream from about 1 to about 24 hours.

9. The method of claim 8 wherein step (a) comprises reducing the pH of the stream to about 6 or less.

10. The method of claim 1 wherein step (b) comprises adding said ferrous sulfate solution at a concentration sufficient to produce a green precipitate upon the addition of hydroxide ion in step (c).

11. The method of claim 1 wherein the ferrous sulfate solution comprises from about 10% to about 25% ferrous sulfate by weight.

12. The method of claim 1 wherein step (b) comprises adding said ferrous sulfate solution in an amount effective to reduce and/or precipitate substantially all of said contaminant.

13. The method of claim 1 wherein step (c) comprises treating said stream with a solution selected from the group consisting of sodium hydroxide, calcium hydroxide, barium hydroxide, ammonium hydroxide, potassium hydroxide, magnesium hydroxide, or mixtures thereof.

14. The method of claim 13 wherein the hydroxide solution is an alkali metal hydroxide solution comprising from about 10% to about 50% alkali metal hydroxide by weight.

15. The method of claim 1 wherein step (d) comprises adding said flocculant in an amount of from about $1 \times 10^{-4}$ to about $5 \times 10^{-3}$ pounds per pound of coprecipitate.

16. The method of claim 1 wherein said coprecipitates are separated from the clean stream by settling and/or filtration.

17. The method of claim 1 wherein steps (a) through (d) are done sequentially.

* * * * *